Patented May 24, 1938

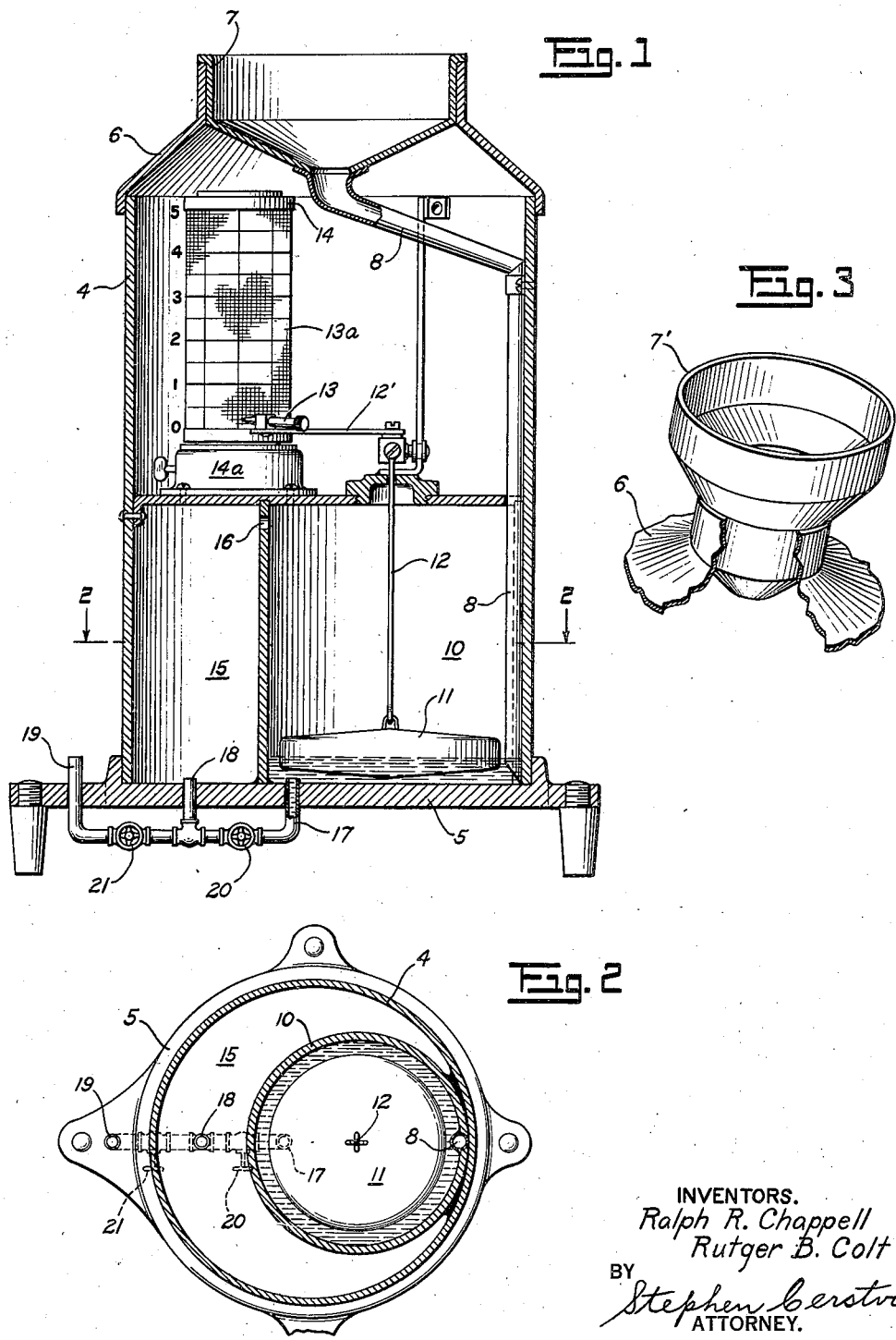

2,118,459

UNITED STATES PATENT OFFICE 2,118,459

FLOAT TYPE RAIN GAUGE

Ralph R. Chappell, Richmond, Va., and Rutger B. Colt, Baltimore, Md., assignors to Bendix Aviation Corporation, South Bend, Ind., a corporation of Delaware Application May 21, 1935, Serial No. 22,638

9 Claims. (Cl. 73—151)

The present invention relates to rainfall measuring apparatus or rain gauges and more particularly to rain gauges of the float type.

Heretofore, in connection with apparatus of this character, serious difficulties and inconveniences have presented themselves in cases when apparatus of small measuring range, say up to 5" of rainfall, were exposed to occasional heavy rainfalls, or when they were not inspected and emptied before their float containers were filled. In such cases the apparatus was overflooded and rendered inoperative. In spite of the above difficulties, however, it is undesirable for practical convenience and design to increase the size of the collecting container of apparatus of this type since it would in turn necessitate corresponding increase in the size of the recording means employed, and as a result, the entire apparatus with the usual arrangement of parts would be rendered unsuitable and objectionable in its proportions. On the other hand, increasing the volume of the float container and, consequently, the range of the apparatus by increasing the cross-sectional area of its float container and thus providing for occasional heavy rainfalls is equally objectionable, since in this case the increase of the range of the apparatus would be made at the expense of the accuracy of its performance in the lower range of measurements in which the apparatus normally operates.

Accordingly, it is one of the objects of the present invention to provide novel means whereby a desired increase in the range of a rainfall measuring apparatus can be accomplished without decreasing in the normal range of operation the rise of the float per cubic unit of the water collected, and without increasing the outward dimensions of the float container and/or the size of the record rolls.

Another object of the invention is to provide novel means whereby the rise of the float of a rainfall measuring apparatus per cubic unit of water collected may be changed in any desired proportion.

A still further object of the invention is to provide novel means whereby the scale, in which the amount of water collected is recorded on the chart, can be varied in any desired way.

A still further object of the invention is to provide, in apparatus of the class described, novel means which will prevent overflooding of rainfall measuring apparatus of small sizes and compact proportions during unexpectedly heavy rainfalls, or due to delays in inspection.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only and is not designed as a definition of the limits of the invention, reference being had for this purpose to the appended claims.

In the drawing, wherein like reference characters refer to like parts throughout the several views, Fig. 1 is a vertical sectional view of a rainfall measuring apparatus embodying the present invention;

Fig. 2 is a sectional view of the apparatus shown in Fig. 1, the section being taken on line 2—2 of Fig. 1; and Fig. 3 is a perspective view, with a portion broken away, of a detachable collector ring used with the rainfall measuring apparatus embodying the present invention.

The foregoing objects are obtained in accordance with a feature of the invention by providing overflow containers, or tanks, into which the collected water will flow after the float container is filled, and measuring the contents of all containers as one quantity.

Referring to the drawing, the apparatus embodying the present invention comprises, in the form shown, an outside shell, or cylinder 4 provided with a bottom plate 5 and a cover 6. The cover 6 is provided with an opening adapted to receive and to hold a collector ring 7 exposing a definite rain-collecting area. Said area may be of any suitable shape, circular shape being preferred for manufacturing and other reasons. The collector ring 7 is provided with a bottom part so constructed and arranged that the rain water collected by the exposed area is thereby directed to the receiving end of a conduit 8 and is delivered through said conduit into a float container or collector tank 10. The container 10 may be made of any suitable cross-sectional shape but its cross-sectional area must have a definite relationship to the area of the collector ring 7. It is preferable to make the ring 7 and the container 10 of equal cross section of circular shape. The float container 10 is provided with a float 11, which float with the aid of a push-rod 12 and a style-carriage 12' operates a recording-style 13 cooperating with a chart 13a held on a clock-driven drum 14, the clock mechanism being contained in the casing 14a. No further description of the float, style-carriage, chart, and of the clock-driven drum need be given here, since they form no part of the present invention, and, consequently, may be of any suitable construction.

The float container 10 is placed in a close proximity to an overflow container 15. The height of the container 15 is substantially equal to that of the container 10, and its cross-sectional area has a predetermined relationship to that of the container 10. It is preferable to place the container 10 eccentrically inside of the container 15, as shown in Fig. 2, both containers being made of circular cross section and the container 15 being made of such a diameter that the volume of that portion thereof which is not displaced by the container 10 is equal to the volume of said container 10. In other words, when both containers are filled, they hold twice the volume of what the container 10 is capable of holding alone. An opening 16 is provided near the top of the container 10, thereby permitting the water, when it reaches said opening, to overflow into the container 15.

Means are provided for effecting communication between the containers 10 and 15, and allowing for emptying both of said containers to the same predetermined minimum level which must be sufficient to float the float 11. In the present embodiment of the invention, said means are represented by pipes 17, 18, a stand-pipe 19, and valves 20 and 21.

In operation, valves 20 and 21 being closed, the rain water is collected in the container 10, and if the ring 7 and the container 10 have equal cross-sectional areas, the float 11 rises 1" per 1" of rainfall and it is so recorded on the chart 13a.

During a heavy rainfall, when the container 10 is soon filled, the apparatus does not become flooded and inoperative, since the water is allowed to overflow through the opening 16 into the overflow container 15. At the time of inspection, if such a condition is found to exist, the water in both containers is allowed to come to the same level by opening the valve 20, whereupon the total amount of water in both tanks is indicated on the chart in 1" to 2" scale. If a heavy rainfall is anticipated, the valve 20 may be left open, in which case the record in 1" to 2" scale is continuously produced from the beginning of the operation of the apparatus, the range of which thus becomes increased twofold. By attaching to the apparatus a ring 7' with the exposed area twice that of the ring 7, the rise of the float will be increased to 2" per 1" of rainfall. The area of such a collector ring may be made of any relationship to the area of the float container, and consequently, the rise of the float per 1" of rainfall may be increased in any desired proportion. It should be expressly understood, however, that although only one overflow container is provided in the construction described, any practical number of such containers may be incorporated into a rainfall measuring apparatus in which case when the first overflow container is filled the water will begin passing into the second one, and so on; the final reading being taken on a corresponding scale.

There are thus provided novel means whereby flooding of rainfall measuring apparatus is made improbable; recording of the amount of rainfall beyond the range of the apparatus is made without sacrificing the accuracy of measurements within the range for which the apparatus is primarily intended and within which it is normally operating; and whereby rise of the float per cubic unit of rainfall can be increased or decreased in any desired proportion without affecting the size and compactness of an apparatus.

While only one embodiment of the invention has been shown and described, it is to be expressly understood that the invention is not limited thereto, but that it may be embodied in various forms. For example, different means effecting communication between containers may be employed, as well as other changes be made in sizes and their relationships, and in relative location of various elements of apparatus, as well understood by those skilled in the art, without departing from the scope of the invention. Reference will, therefore, be had to the appended claims for a definition of the limits of the invention.

What is claimed is:

1. In rainfall recording apparatus, the combination of a float container, a float in said container, an indicator actuated by said float, an overflow container adapted to receive the overflow from said float container when the latter is filled, and means whereby the rain water in both containers may be brought to the same level.

2. In an apparatus of the character described, the combination of a container provided with means operating to measure its contents continuously and to make a record thereof, and an overflow container adapted to receive the overflow from said measuring container, and means controlling the flow between said containers whereby the contents of both of said containers may be measured as one quantity by said measuring means.

3. In an apparatus of the character described, a float container adapted to receive the water collected and provided with a measuring float and recording means, an overflow container adapted to receive water from said float container when the latter is filled, and means operated at will whereby said containers can be placed into communication with each other near their bottoms and whereby said containers may be emptied to a predetermined minimum level.

4. In an apparatus of the character described, the combination of a float container adapted to receive and to hold the water collected and provided with means including a float for continuously measuring and recording the amount of water collected, an overflow container having a volume equal to that of the float container and adapted to receive the overflow from said float container when the latter is filled, and means controlling the flow between said containers whereby said overflow may be measured as one quantity with the contents of the float container by the measuring means thereof.

5. In an apparatus of the character described, the combination of a container provided with means for continuously measuring its contents, an overflow container having a height substantially equal to that of the measuring container and having a cross-sectional area of a predetermined relationship to that of the measuring container, said measuring container having near its top an opening leading into said overflow container, and means providing communication between said containers near their bottoms for emptying said containers to a predetermined minimum level.

6. In a rainfall measuring apparatus, the combination of a float container provided with a float, an indicator actuated by said float, and an overflow container, both containers being made in the form of cylinders of substantially equal height, the float container being placed eccentrically inside of the overflow container, the volume of that portion of said overflow container which is not displaced by said float container having a predetermined relationship to the volume of the float container, the float container being provided near its top with an opening leading into said overflow container; and means for establishing communication between said containers near their bottoms to bring the contents of both containers to a common level and for emptying said containers to a minimum level sufficient to insure floating of said float in the float container.

7. In apparatus of the class described, the combination of a measuring container, liquid level responsive means for said container, indicating means actuated by said responsive means, an overflow container adapted to receive the overflow from said measuring container when the latter is filled, and means whereby the rain water in both containers may be brought to the same level.

8. In apparatus of the class described, the combination of a measuring container, liquid level responsive means for said container, indicating means actuated by said responsive means, an overflow container having a volume equal to that of the measuring container and adapted to receive the overflow from said measuring container when the latter is filled, and means controlling the flow between the two containers whereby said overflow may be measured as one quantity with the contents of the measuring container by said responsive means.

9. In apparatus of the class described, the combination of a measuring container, liquid level responsive means for said container, indicating means actuated by said responsive means, an overflow container adapted to receive the overflow from said measuring container when the latter is filled, and means operated at will whereby said containers may be placed into communication with each other near their bottoms and whereby said containers may be emptied to a predetermined minimum level.

RALPH R. CHAPPELL.
RUTGER B. COLT.